United States Patent
Pientka et al.

[11] Patent Number: 5,896,018
[45] Date of Patent: Apr. 20, 1999

[54] DEVICE FOR OPERATING A WINDSHIELD WIPER

[75] Inventors: Rainer Pientka, Achern; Henry Blitzke, Buehl; Joerg Buerkle, Offenburg, all of Germany

[73] Assignee: Robert Bosch GmbH, Stuttgart, Germany

[21] Appl. No.: 08/784,135

[22] Filed: Jan. 15, 1997

[30] Foreign Application Priority Data

Jan. 19, 1996 [DE] Germany ............... 196 01 781

[51] Int. Cl.$^6$ ............... B60S 1/08; H02P 1/04
[52] U.S. Cl. ............... 318/483; 318/443; 318/444; 318/DIG. 2; 15/250.12; 15/250.17
[58] Field of Search ............... 318/440–483, 318/DIG. 2; 250/339.1, 227.25; 15/250.12, 250.17, 250 C

[56] References Cited

U.S. PATENT DOCUMENTS

| | | | |
|---|---|---|---|
| 4,710,878 | 12/1987 | Iyoda | 318/444 |
| 4,916,374 | 4/1990 | Schierbeek et al. | 318/483 |
| 5,140,234 | 8/1992 | Wallrafen | 318/264 |
| 5,225,669 | 7/1993 | Hasch et al. | 250/214 AL |
| 5,252,898 | 10/1993 | Nolting et al. | |
| 5,276,388 | 1/1994 | Levers | 318/444 |
| 5,276,389 | 1/1994 | Levers | 318/444 |
| 5,306,992 | 4/1994 | Dröge | |
| 5,319,293 | 6/1994 | Levers | 318/483 |
| 5,336,980 | 8/1994 | Levers | 318/444 |
| 5,508,595 | 4/1996 | Schaefer | 318/444 |
| 5,568,027 | 10/1996 | Teder | 318/483 |
| 5,666,037 | 9/1997 | Reime | 318/483 |

FOREIGN PATENT DOCUMENTS

| | | |
|---|---|---|
| 4018903 | 10/1992 | Germany. |
| 4036407 | 6/1994 | Germany. |
| 2301458 | 12/1996 | United Kingdom. |

*Primary Examiner*—Paul Ip
*Attorney, Agent, or Firm*—Spencer & Frank

[57] ABSTRACT

A device for operating a windshield wiper with an automatic wiper control. A fast reaction to a suddenly occurring heavy wetting event is assured without adversely affecting the sequence of intermittent wiper operation. This is achieved by an evaluation unit which has a surge detection stage that makes it possible to detect, during intermittent operation when a sensor signal falls short of a surge threshold and by triggering a control signal for at least one wiping action when the signal falls short of the surge threshold.

8 Claims, 1 Drawing Sheet

DEVICE FOR OPERATING A WINDSHIELD WIPER

CROSS-REFERENCE TO RELATED APPLICATION

This application claims the priority of Patent Application Serial No. 1 96 01 781.5-22, filed in Germany on Jan. 19, 1996, the subject matter of which is incorporated herein by reference.

BACKGROUND OF THE INVENTION

The present invention relates to a device for operating a windshield wiper with an automatic wiper control, comprising a sensor unit that detects the wetting condition of a windshield, an evaluation unit that evaluates a sensor signal, as well as an actuation stage that responds to a control signal from the evaluation unit and functions to operate a windshield wiper motor by means of an output signal.

Such a device is described in DE 40 18 903 C2, which shows an automatic wiper control of this known device has an intermittent operation wherein the intervals between wipes are automatically adjusted to the existing wetness on the windshield, such as rain, snow or dirt, so that the interval changes do not distract the driver. If the wetting condition changes during the interval operation, it is possible to switch, if necessary, temporarily to a continuous operation, wherein corresponding measuring and program sequences run between the change-overs. Such a control can prove unfavorable if the windshield is subjected suddenly to a lot of wetting.

It is the object of the invention to overcome the drawback of the prior art device by providing a device for operating a windshield wiper of the aforementioned type in such a way that a optimum operation is assured even if a lot of wetting occurs suddenly.

SUMMARY OF THE INVENTION

This object and others are achieved by providing a device having an evaluation unit which has a surge detection stage that makes it possible to detect, during intermittent operation, when the sensor signal falls below a surge threshold that is below a difference threshold which, if the signal falls below this difference threshold, indicates a normal wetting event used to calculate the interval time. After falling below the surge threshold and inducing the surge detection stage, a control signal for at least one wiping action can be triggered, and the intermittent operation continues during the surge detection and any triggered wiping action. On the basis of these measures, the occurrence of a surge is detected with certainty and a wiping operation is triggered before the just adjusted interval is completed, so that clear visibility conditions can be restored quickly for the driver. The intermittent operation continues in the meanwhile, so that the wiping action continues to be adjusted to the prevailing basic conditions on the outside. The wiper control thus reacts in an optimum way to a sudden wetting event, which is superimposed on the prevailing wetting conditions, so that the adjustment to the prevailing wetting conditions is maintained at the same time.

The surge detection and reaction to a surge is due to the fact that a length of time can be measured with the surge detection stage, during which the sensor signal falls below the surge threshold, and that the wiping action can be triggered as soon as the this length of time exceeds a predetermined time, wherein the predetermined time is shorter than an actual, remaining interval time. A certain surge detection and triggering of the wiping operation here is ensured in that the surge detection stage detects the length of time for which the sensor signal falls below the surge threshold via successive test pulses that appear in the range of several ms and that the predetermined time is at most 500 ms. In this case, a predetermined time for detecting a surge of, for example 100 ms, is advantageous because with such a predetermined time, the wetting event on the one hand can be identified reliably as a surge and on the other hand, it is certain that the wiping operation is triggered sufficiently fast for the driver. Test pulses at intervals of, for example, 5 ms result in a sufficiently dense succession in time and number within the predetermined time for recognizing a surge, in order to make a sure determination and, if necessary, trigger a wiping action.

The surge threshold that lies below a threshold for a normal difference triggering is, for example, 75% or less of a reference value, for example two thirds or half.

For a quick removal of the wetting condition caused by a surge, it is advantageous if the wiping action is induced by the surge detection stage that occurs during a fast stage II.

A fast and for the most part complete removal of the wetting caused by a surge is achieved in that during the surge detection at least one wiping action is triggered in a fast stage II subsequently at least one wiping action in a slower stage I, because the wetting is removed quickly in stage II, while a more effective wiping operation and thus also a better cleaning of the windshield is achieved in stage I.

BRIEF DESCRIPTION OF THE DRAWINGS

These and other features and advantages of the invention will be further understood from the following detailed description of the preferred embodiments with reference to the accompanying drawings in which.

DETAILED DESCRIPTION OF THE PREFERRED EMBODIMENTS

Figure 1:
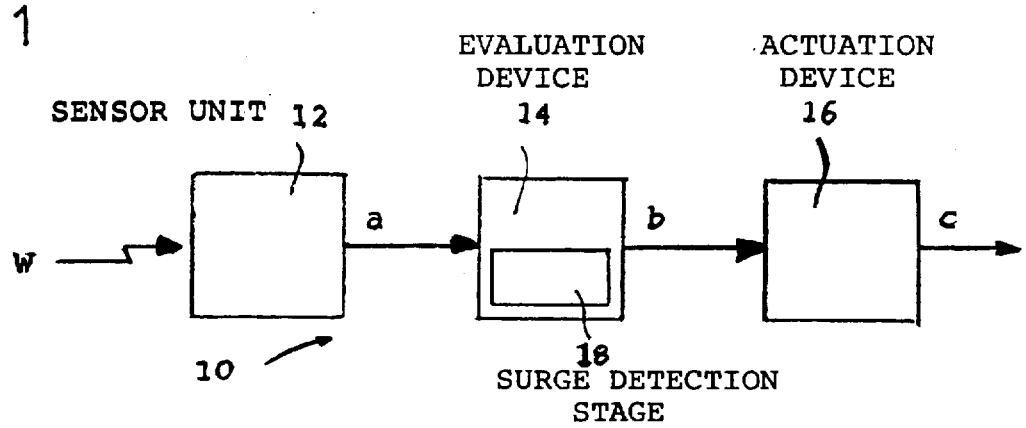
FIG. 1 is a block diagram showing the stages of an automatic wiper control.

FIG. 1 shows a block diagram of an automatic windshield wiper control 10 having a sensor unit 12 which puts out a sensor signal a of which is applied to an evaluation device 14. The evaluation device 14 transmits a control signal b to an actuation stage 16, which actuates a wiper motor via an output signal c, in order to start a wiping action.

The sensor unit 12 reacts to the wetting event W, e.g. rain, dirt or snow on a windshield, and emits a corresponding sensor signal a. An interval control stage (not shown) is provided in the evaluation unit, which automatically starts to operate when the corresponding outer wetting conditions occur, e.g., when the visibility through the windshield is impaired due to small water droplets. If, during intermittent operation, there suddenly occurs a wetting event which impedes the driver's visibility through the windshield, it is important that a way be provided to allow the wiper control to react quickly and reliably, and to this end, there is provided a surge detection stage 18 which is a part of the evaluation stage 14. The surge detection stage 18 detects a drop in the sensor signal a which is caused by a surge and subsequently triggers a fast wiping action, without waiting for the end of the interval.

Figure 2:
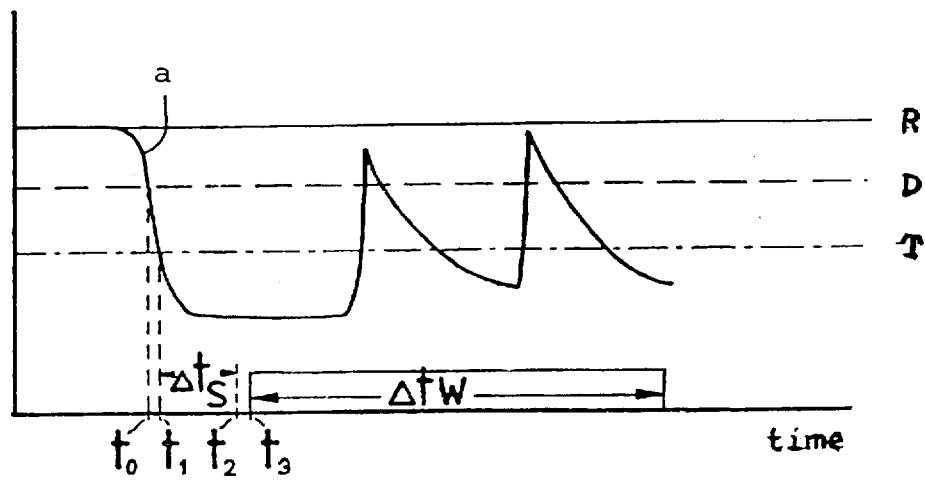
FIG. 2 Shows the time sequence of the processes taking place when a surge occurs.

FIG. 2 shows the time sequence of the steps when a surge is detected. The sensor signal undergoes a strong change when a surge occurs, which has the effect of a sharp drop of a signal by the optical sensor which is assumed to be part of the system, since the amount of light striking the light receiver is reduced considerably by the surge. The signal will fall short of a difference threshold D at a point in time $t_o$, which is of importance for the evaluation and the responding of the wiper control for a "normal" wetting event. The signal will then fall short of a surge threshold at a point in time $t_1$. The point in time when the signal falls short of the threshold T is detected by the surge detection stage 18, and measurements are taken subsequently, for example at intervals of 5 ms. If the signal remains short of the surge threshold T for a certain number of measurements, e.g. 20, a control signal is triggered for a wiping action following the thereby preset time $\Delta t_s$ at point in time $t_2$, which is then set in motion shortly thereafter at a point in time $t_3$. If the wiper wipes across the sensor surface during the length of time of a wiping action $\Delta t_w$, the wetting is for the most part removed on the sensor of the sensor unit 12, so that once again nearly the total amount of light falls onto the receiver of the sensor unit 12 and the sensor signal a again reaches nearly the reference value R. The sensor signal a can subsequently retreat again because the surge has not yet stopped or because the wetting has not been removed completely and the wetting conditions upon which the interval operation is based also have an effect. If necessary, another surge is detected or a new wiping action is triggered during resumed intermittent operation, so that another cleaning of the windshield takes place.

The wiping action triggered if a surge is detected is preferably performed during a fast stage II in order to quickly restore the visibility. The predetermined time $\Delta t_s$ of 100 milliseconds for detecting the surge is hardly noticed by the driver and, on the other hand, ensures a safe identification of a surge. A preset time of, for example, 500 ms would still be acceptable. In order to achieve a subsequent cleaning following the fast wiping action in stage II, the wiping action triggered when the surge is detected can also comprise an additional wiping operation at a slower stage I, subsequent to the wiping action at stage II. The length of time of the wiping action $\Delta t_w$ in stage II, which is shown in FIG. 2, is for example 0.8 second while a subsequent wiping action in stage I would last, for example for 1.2 seconds.

Thanks to the features described above, the system can react during an interval operation to a sudden reduction of the visibility caused by a strong wetting event, without interrupting the control sequences of the intermittent operation. Following the surge event, which can generally be expected to be short-lived, normal intermittent operation will be resumed.

It will be understood that the above description of the present invention is susceptible to various modifications, changes and adaptations, and the same are intended to be comprehended within the meaning and range of equivalents of the appended claims.

What is claimed is:

1. A device for operating a windshield wiper with an automatic wiper control, comprising a sensor unit that detects the wetting condition of a windshield, an evaluation unit that evaluates a sensor signal, and an actuation stage that responds to a control signal from the evaluation unit and functions to operate a windshield wiper motor by means of an output signal, said evaluation unit having a surge detection stage for detecting, during intermittent operation, when the sensor signal falls short of a surge threshold that falls short of a difference threshold which, if the signal falls short of this difference threshold, indicates a normal wetting event, used to calculate the time interval between wipes, and means effective after falling below of the surge threshold and upon inducement from the surge detection stage for triggering a control signal for causing at least one wiping action, the intermittent operation of the device continuing during surge detection and any wiping action resulting therefrom.

2. A device according to claim 1, wherein said surge detection stage measures a length of time for which the sensor signal falls short of the surge threshold and triggers the wiping action as soon as the length of time exceeds a predetermined time which is shorter than the time between wipes during intermittent operation.

3. Device according to claim 2, wherein said surge detection stage detects the length of time for which the sensor signal falls short of the surge threshold via successive test pulses in the range of several ms and that the predetermined time interval is at least 500 ms.

4. Device according to claim 3, wherein said predetermined time is 100 ms.

5. Device according to claim 3, wherein the test pulses follow successively at intervals of 5 ms.

6. Device according to claim 1, wherein the surge threshold is at most 75% of the reference value.

7. Device according to claim 1, wherein the wiping action induced by said surge detection stage takes place in a fast stage II.

8. Device according to claim 1, wherein during the surge detection, at least one wiping action is triggered in a fast stage II and a wiping action is subsequently triggered in a slower stage I.

* * * * *